(12) United States Patent
Miller et al.

(10) Patent No.: US 8,031,332 B2
(45) Date of Patent: Oct. 4, 2011

(54) LAYOUT METHOD

(75) Inventors: Robert Miller, Commerce City, CO (US); Lawrence Smith, Dayton, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 251 days.

(21) Appl. No.: 12/274,876

(22) Filed: Nov. 20, 2008

(65) Prior Publication Data

US 2010/0123892 A1 May 20, 2010

(51) Int. Cl.
*G01C 3/08* (2006.01)
*G01C 1/00* (2006.01)

(52) U.S. Cl. .................... 356/4.01; 356/141.5
(58) Field of Classification Search ............. 356/4.01, 356/141.1, 141.5, 614
See application file for complete search history.

(56) References Cited

U.S. PATENT DOCUMENTS

| | | | |
|---|---|---|---|
| 6,052,083 A | 4/2000 | Wilson | |
| 6,140,957 A | 10/2000 | Wilson et al. | |
| 6,246,468 B1 * | 6/2001 | Dimsdale | 356/4.02 |
| 6,480,148 B1 | 11/2002 | Wilson | |
| 6,590,640 B1 * | 7/2003 | Aiken et al. | 356/3.01 |
| 6,850,946 B1 * | 2/2005 | Rappaport et al. | 707/796 |
| 7,313,506 B2 * | 12/2007 | Kacyra et al. | 703/6 |
| 2008/0046221 A1 * | 2/2008 | Stathis | 703/1 |
| 2008/0074638 A1 * | 3/2008 | Sakimura et al. | 356/4.01 |
| 2009/0138233 A1 * | 5/2009 | Kludas et al. | 702/158 |

OTHER PUBLICATIONS

Feldman, William et al., Work Management Software for the Field, Contractormag.com, Jul. 1, 2008.

* cited by examiner

*Primary Examiner* — Isam Alsomiri
(74) *Attorney, Agent, or Firm* — Dinsmore & Shohl LLP

(57) ABSTRACT

The location of one of a series of construction points at an indoor construction site is established using a robotic total station and a handheld device. Construction data is inputted into the handheld device with the construction data defining a plurality of construction points at the construction site. One of the plurality of construction points is selected with the handheld device. Data regarding the selected construction point is then transmitted wirelessly from the handheld device to a robotic total station. The robotic total station generates a beam of laser light, and directs the beam of laser light from the robotic total station to the construction point. The construction point is defined by x and y coordinates, and by an assumed z coordinate. The actual z coordinate is that of a point on a horizontal surface, such as a ceiling or floor, having the same x and y coordinates. Through an iterative process, the location of the construction point is established.

13 Claims, 5 Drawing Sheets

LAYOUT METHOD

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

Laying out mechanical, electrical and plumbing systems in new buildings under construction, or in existing buildings undergoing renovations or additions, is tedious, time consuming, and expensive. Typically, it has required a significant amount of labor to lay out construction points at a construction site for sleeves and hangers on floors and ceilings. This process has required teams of workers that measure and mark the locations of these points, with much of the work being accomplished manually. It will be appreciated that such a process is subject to errors, both from measurement mistakes and from accumulated errors which compound as measurements are made from one intermediate point to the next. Further, building designs and requirements have become more complex, and construction schedules have become tighter, adding to the need to facilitate and simplify the layout process.

Total stations have been used in the past both for outdoor surveying, and for machine control. In a typical surveying application, a total station, positioned at a known location, directs a beam of laser light to a target positioned by a surveyor at a point to be surveyed. The target may include retro reflectors which reflect the beam back to the total station. By measuring the time of flight of the beam, the distance between the total station and the target is determined. By also measuring the direction of the beam from the total station to the target, i.e., the altitude and azimuth angles that define a vector from the total station to the target, the location of the target is precisely determined.

Robotic total stations have been developed that are capable of locating and tracking a target without being attended by an operator. With a robotic total station, the surveyor moves the target around the work site. Servo motors in the robotic total station cause it to rotate toward the target, providing precise angular and distance measurements as the surveyor moves to various locations at the work site. The total station automatically tracks the remote target as it moves, thus providing real-time position data for the target.

SUMMARY OF THE INVENTION

A method is provided of establishing the location of one of a series of construction points at an indoor construction site. The method includes the steps of inputting construction data into a handheld device, the construction data defining a plurality of construction points at the construction site, and selecting one of the plurality of construction points with the handheld device. Data regarding the selected construction point is then transmitted wirelessly from the handheld device to a robotic total station. The robotic total station generates a beam of laser light, and directs the beam of laser light from the robotic total station to the construction point.

The step of inputting construction data into a handheld device may include the step of downloading construction plans into the handheld device from a computer. The step of inputting construction data into a handheld device may include the step of receiving construction data wirelessly at the construction site from a remote location. The step of inputting construction data into a handheld device may include the step of receiving construction data via e-mail at the construction site from a remote location.

The step of inputting construction data into a handheld device may includes the steps of positioning a retro reflector at a construction point at the construction side, measuring the location of the construction point with the robotic total station by directing a beam of laser light from the total station to the retro reflector, and transmitting data wirelessly from the robotic total station to the handheld device. The step of selecting one of the plurality of construction points with the handheld device may include the steps of displaying construction data on a device display, and manually selecting the data.

A method of establishing the location of one of a series of construction points at an indoor construction site, where the point is defined by x and y coordinates and an anticipated z coordinate on a generally horizontal building surface, with the construction point being established on an actual building surface by illumination of a point on the actual building surface that has the x and y coordinates, includes the steps of inputting construction data into a handheld device, the construction data defining a plurality of construction points at the construction site, and selecting one of the plurality of construction points with the handheld device. A beam of light is generated with a robotic total station, and the beam is directed from the robotic total station toward the selected construction point, defined by the x and y coordinates and the anticipated z coordinate on a generally horizontal building surface. The distance from the robotic total station to a point on the actual building surface which is illuminated by the beam is determined. If the distance from the robotic total station to the point on the actual building surface is greater or less than anticipated, an updated construction point is determined. The beam is directed at the updated construction point, and the distance to the illuminated point on the actual building surface determining is determined. If the distance to the point on the actual building surface is greater or less than anticipated, the construction point is updated and the process repeated. This may continue until the distance from the robotic total station to the point on the actual building structure is substantially equal to that anticipated, or until a predetermined number of iterations is reached. If successful, a point on the actual building surface having the x and y coordinates is established.

The method may be discontinued after a predetermined number of points on the actual building surface have been illuminated without the distance from the robotic total station to the actual building surface being substantially equal to that anticipated. The generally horizontal building surface may comprise a ceiling surface above the robotic total station. Alternatively, the generally horizontal building surface may comprise a floor surface below the robotic total station. The construction data may include CAD files.

DETAILED DESCRIPTION OF THE PREFERRED EMBODIMENTS

The described methods may be advantageously used in establishing the locations of construction points at an indoor construction site. As an example, during the construction of a building, HVAC contractors must locate and install pipes and ducts above, below, and through ceilings and floors. For such building components, the contractor is typically given a blueprint of the ducts, pipes, and points to affix hangers on the ceilings and floors for securing pipes and ducts, with the x and y positions of the various points. Typically, the contractor must project the blueprint design taken from the paper document, onto the floor or ceiling. Workers typically use power lift equipment, such as a cherry picker, to measure these points on a ceiling for attaching hangers, for example. This is a very time consuming task, especially when a large building or building complex, such as a shopping mall, is being constructed, and many construction points must be measured and marked.

Figure 1:
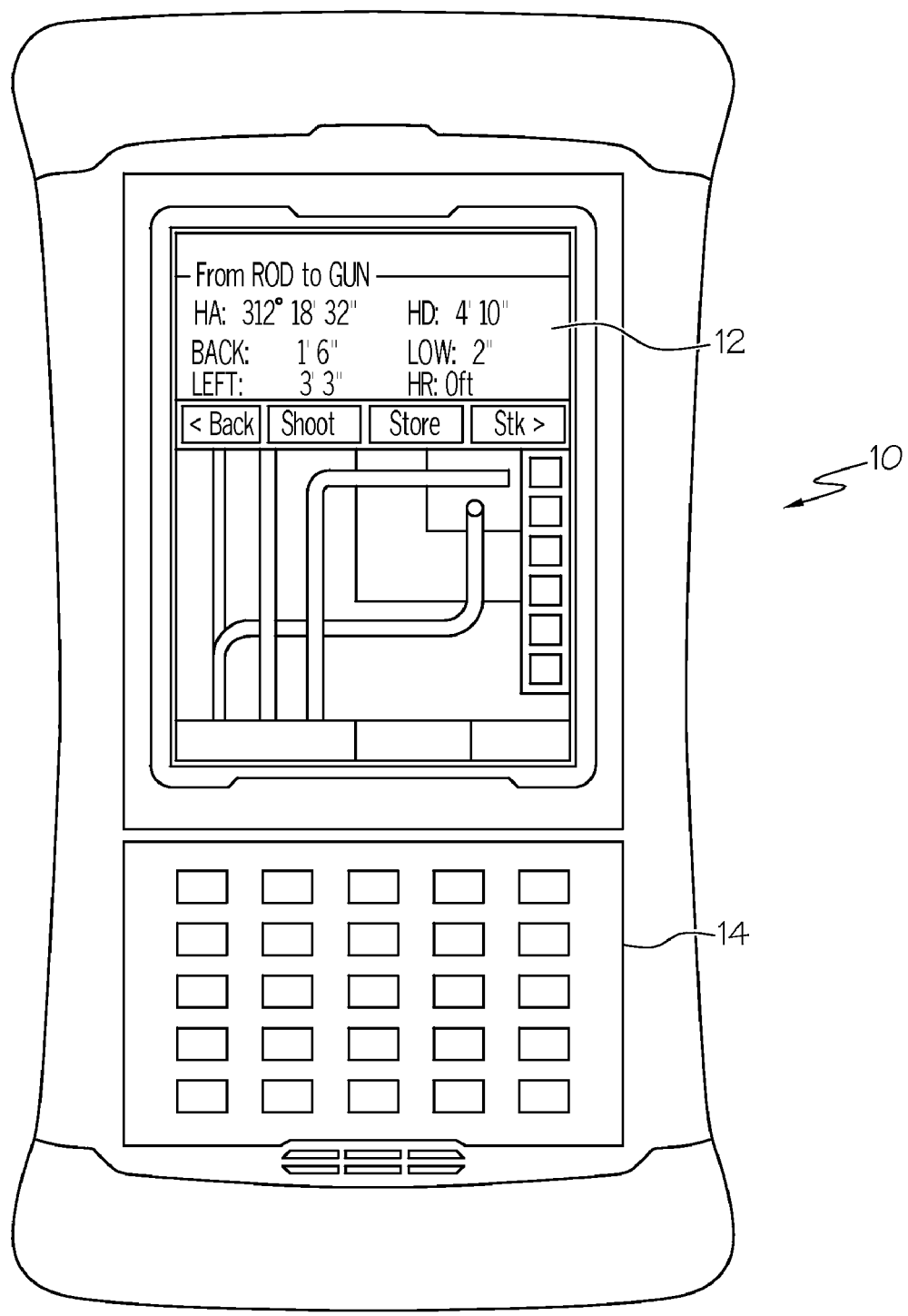
FIG. 1 is a plan view of a handheld device of the type that may be used in practicing the method.

The present method provides a way of much more quickly establishing the location of a series of construction points at an indoor construction site. Such points are defined by x and y coordinates and an anticipated z coordinate on a generally horizontal building surface, such as a ceiling or a floor that has previously been constructed. The construction points are established on the actual building surface by illuminating a point on the actual building surface that has the x and y coordinates. As seen in FIG. 1, construction data, defining a plurality of construction points at the construction site, is inputted into the handheld device 10 and displayed on a display 12. The handheld device 10 includes a keyboard 14, a processor, a memory, and a battery power source. Additionally, the handheld device 10 includes wireless communication capabilities, such as Wi-Fi, Bluetooth, radio, and cellular circuits which permit communication with a robotic total station 16, shown in FIGS. 2 and 3, and also with a remote location, such as a contractor's business office located miles from the construction site. The construction plans may be downloaded directly into the handheld device 10 from a computer through a USB port. Alternatively, the construction data may be received wirelessly at the construction site from a remote location, such as a contractor's office. The construction data may be received via e-mail at the construction site from the remote location.

When a location of one of a series of construction points at an indoor construction site is to be established, the operator first must precisely position the robotic total station 16 at the indoor construction site at a known point in relation to the point coordinates of the construction points. The operator then selects one of the plurality of construction points with the handheld device 10. For this purpose, a drawing of the relevant portion of the construction site is displayed on screen 12, and the point selected with keyboard 14, or by means of touch responsive display 12. The operator then transmits data regarding the selected construction point wirelessly from the handheld device 10 to the robotic total station 16. The robotic total station 16 generates a beam of laser light using the robotic total station, and directs the beam of light from the robotic total station 16 to the location of the construction point 20 to provide a visual indication of the location of the construction point.

Figure 2:
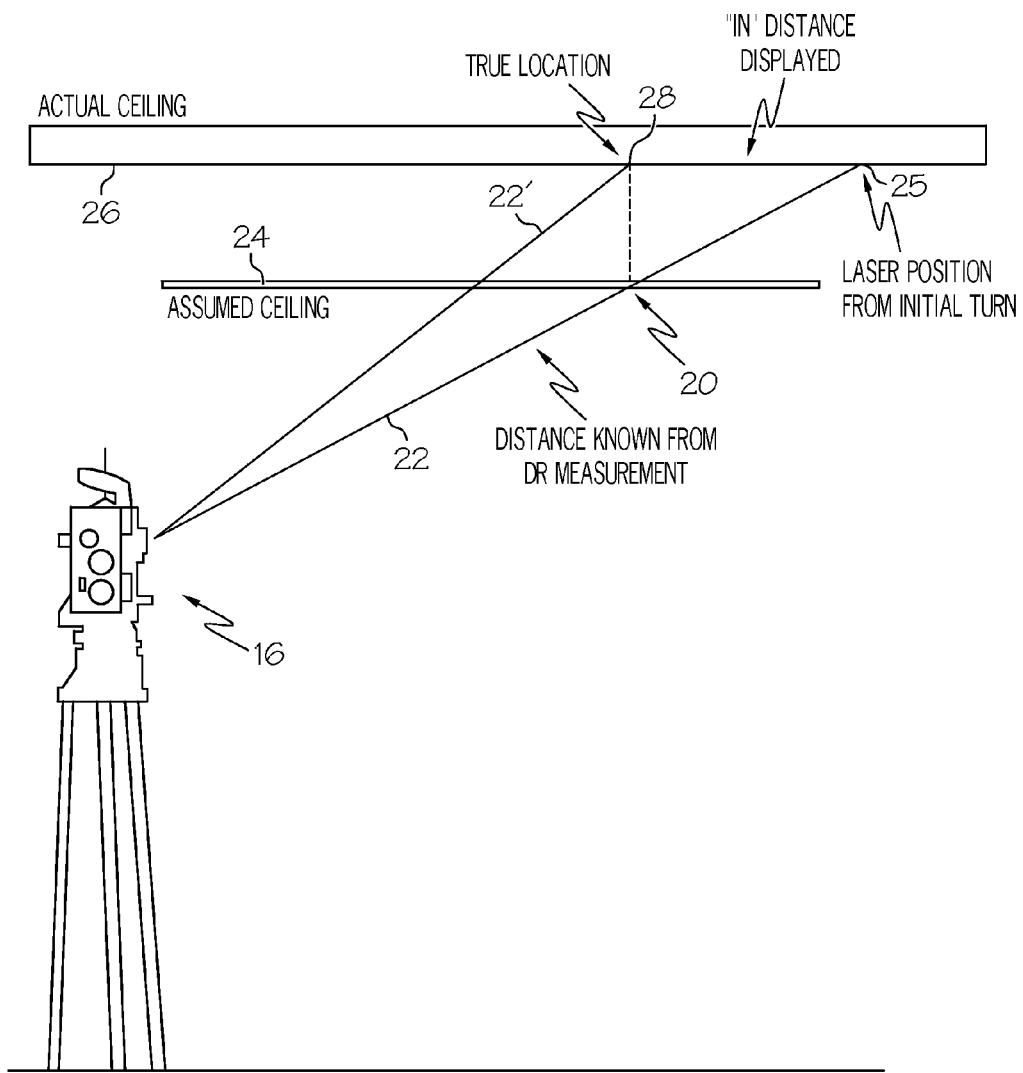
FIG. 2 is a view of a robotic total station, illustrating the method of establishing a construction point at an indoor construction site when the ceiling on which the construction point is to be located is higher than the assumed ceiling height.

As seen in FIG. 2, the direction of the beam 22 is based on the x and y coordinates of the construction point, and an assumed z coordinate, in this case the assumed ceiling height indicated at 24. Typically, ceiling heights and floor heights will be specified by an architect in a design, but the actual heights of the ceilings and floors may vary significantly from the nominal design elevations. As a result, the beam 22 may illuminate a spot 25 on the actual ceiling 26 which has x and y coordinates that differ significantly from those of the construction point. To detect this, the robotic total station measures the distance from the robotic total station to the point on the actual building surface which is illuminated by the beam 22. If the distance from the robotic total station 16 to the point on the actual building surface 22 is greater or less than anticipated, the robotic total station trigonometrically determines an updated construction point 28, and then directs the beam at the updated construction point as indicated at 22'. The robotic total station 16 again determines the distance to the illuminated point 28. If this is an anticipated distance, then a point on the actual building surface having the x and y coordinates is established. As will be appreciated, however, constructed ceilings and floors are not always perfectly flat. As a result, when the distance to point 28 is measured, if it is not the anticipated distance, a new construction point may need to be determined, and the beam once again redirected. This can be continued until the distance from the robotic total station to the illuminated point on the actual building structure is substantially equal to that anticipated. If desired, a maximum number of iterations may be set so that the process does not continue if the robotic total station is not able to locate a construction point. For example, the method may be discontinued after three points on the actual building surface have been illuminated without the distance from the robotic total station to the actual building surface being substantially equal to that anticipated.

Figure 3:
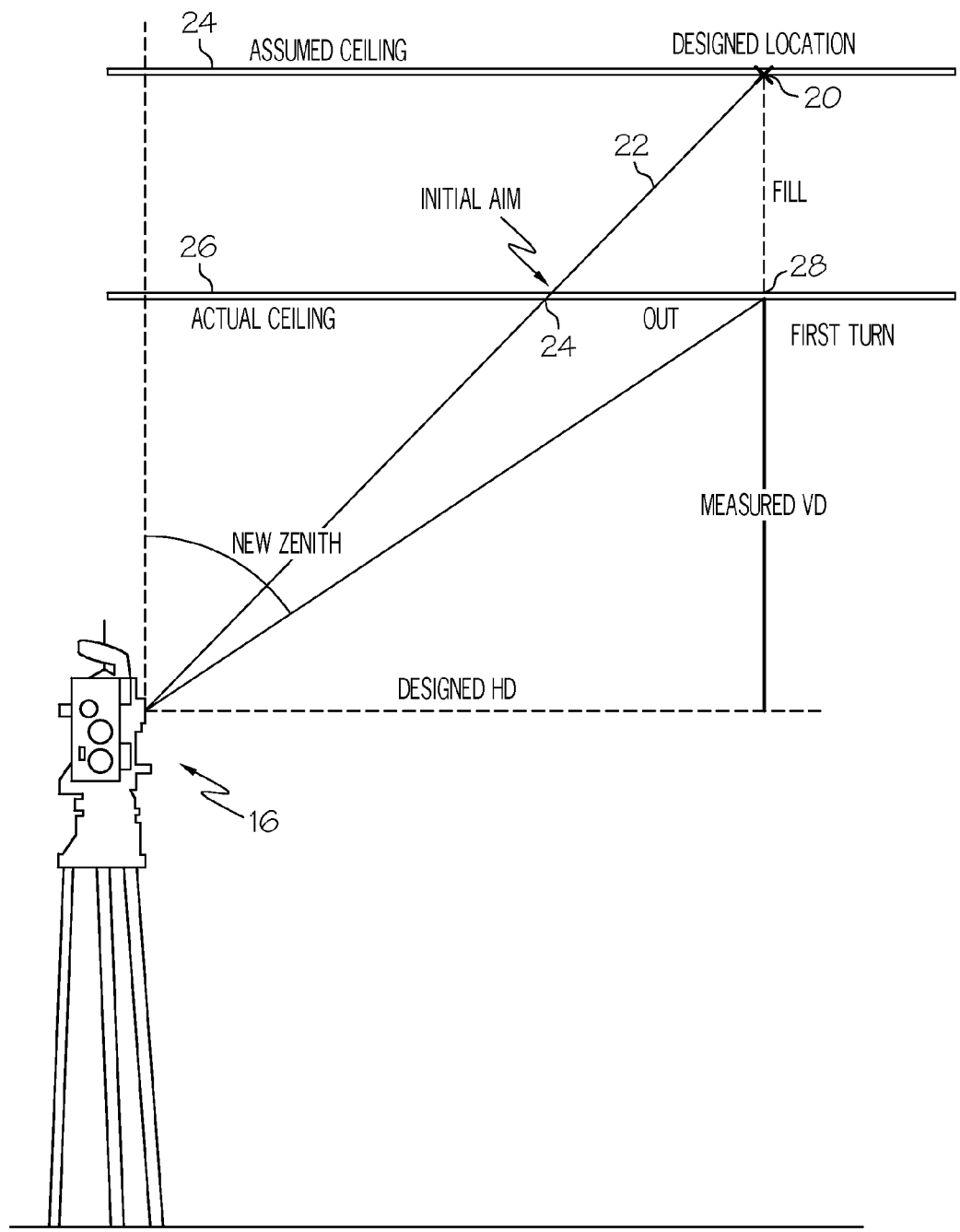
FIG. 3 is a view of a robotic total station, illustrating the method of establishing a construction point at an indoor construction site when the ceiling on which the construction point is to be located is lower than the assumed ceiling height.

FIG. 3 illustrates the instance in which the beam 22 is directed at a construction point 20 having x and y coordinates and an assumed, and erroneous, z elevation for a ceiling 24 that is too high. As a consequence when the robotic total station attempts to illuminate the point 20, the beam actually strikes point 25 on the actual ceiling 26. The robotic total station then detects a distance to the illuminated point 24 which is less than anticipated. This results in a new construction point 28 being determined and the beam 22' redirected toward it. The distance to the point 28 is measured and, assuming that it equals the anticipated distance, the process ceases with the construction point 28 being established by illumination with beam 22'. If the distance measured is other than that anticipated, as would occur if ceiling 26 is not horizontal, then a new updated construction point is determined and the beam redirected toward it. This iterative process continues until a construction point is established or until the iteration are otherwise terminated.

It will be appreciated that the generally horizontal building surface comprises a ceiling surface above the robotic total station, as shown in FIGS. 2 and 3. Alternatively, the handheld device 10 and the robotic station 16 may be used to lay out points on a floor, in which the floor may not be totally uniform in elevation. This process proceeds in the same manner as explained above in respect to locating construction points on a ceiling.

Figure 4A:
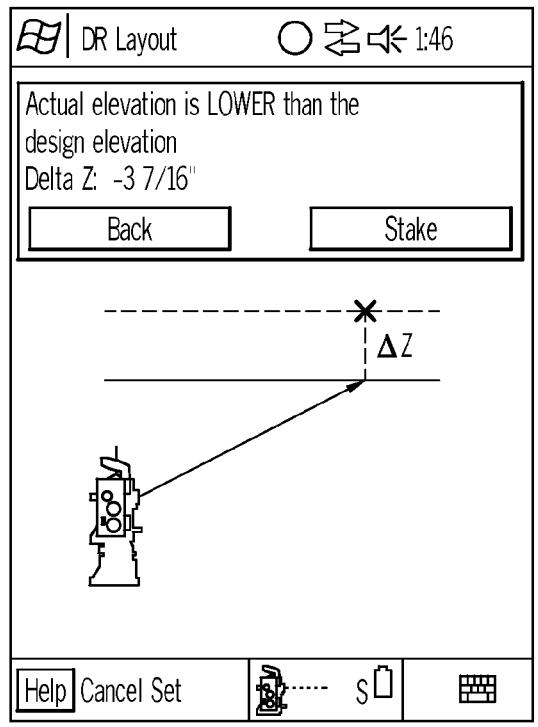
FIG. 4A illustrates the display of the handheld device of FIG. 1 during the process of establishing a construction point at an indoor construction site when the ceiling on which the construction point is to be located is lower than the assumed ceiling height.
Figure 4B:
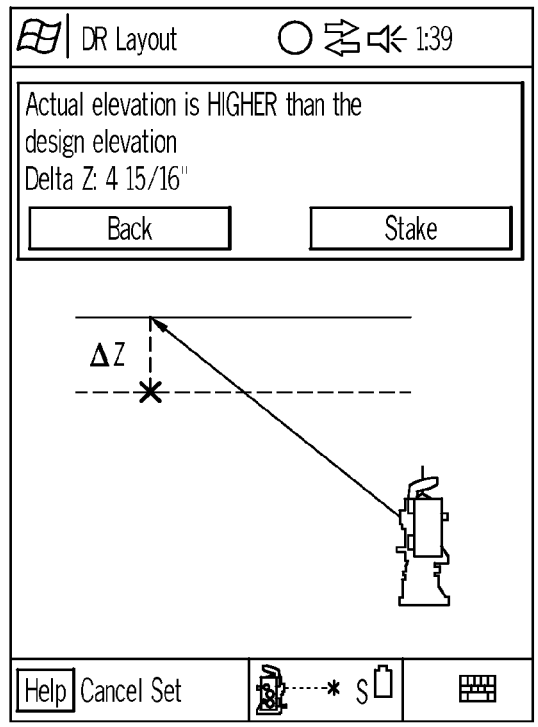
FIG. 4B illustrates the display of the handheld device of FIG. 1 during the process of establishing a construction point at an indoor construction site when the ceiling on which the construction point is to be located is higher than the assumed ceiling height.
Figure 5A:
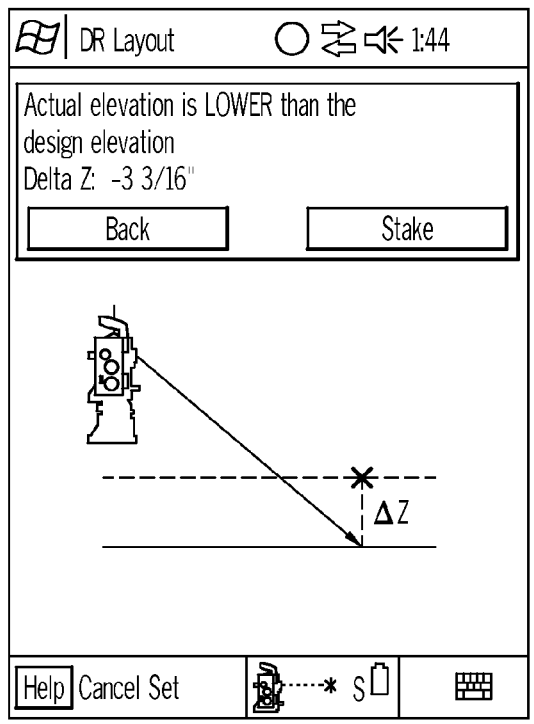
FIG. 5A illustrates the display of the handheld device of FIG. 1 during the process of establishing a construction point at an indoor construction site when the floor on which the construction point is to be located is lower than the assumed floor height.
Figure 5B:
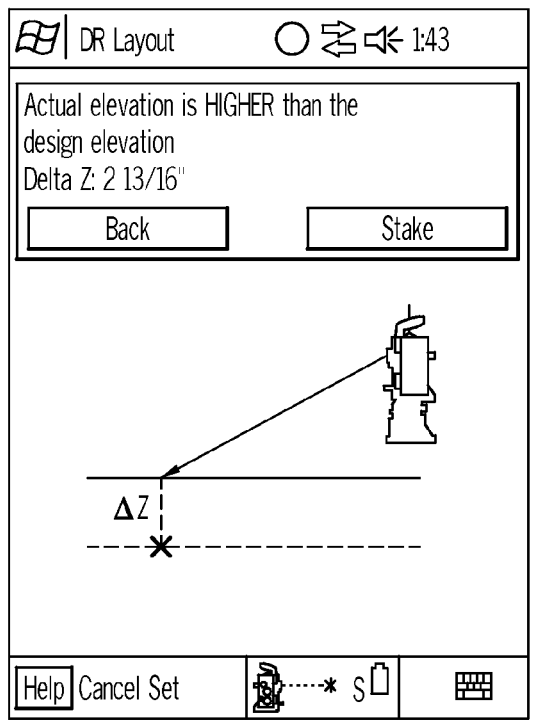
FIG. 5B illustrates the display of the handheld device of FIG. 1 during the process of establishing a construction point at an indoor construction site when the floor on which the construction point is to be located is higher than the assumed floor height.

FIGS. 4A and 4B illustrate the screen display for display 12 for instances where the ceiling is lower or higher than the anticipated ceiling height, respectively. Note that the display indicates to the operator how much the anticipated and actual ceiling heights differ. Similar screen displays are shown in FIGS. 5A and 5B for instances where the floor elevation is lower or higher, respectively, than anticipated.

It will be appreciated that the total station 16 and handheld device 10 may be used to update measurements or provide additional construction points. Construction data may be inputted into the handheld device using a retro reflective target that the robotic total station is set to track. The retro reflector is positioned at the construction point to be inputted. The location of the construction point is then measured with the robotic total station by directing a beam of laser light from the total station to the retro reflector. Data is wirelessly transmitted from the robotic total station to the handheld device. The data can then be transmitted wirelessly from the handheld device to a remote location, where it can be used to update the plans for the construction site.

Other aspects, objects, and advantages of the embodiments can be obtained from a study of the drawings, the disclosure, and the appended claims.

What is claimed is:

1. A method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates, comprising the steps of:
   inputting construction data into a handheld device, said construction data defining a plurality of construction points at the construction site,
   selecting one of said plurality of construction points with the handheld device,
   generating a beam of laser light with a robotic total station,
   directing the beam of laser light from the robotic total station toward the selected construction point, defined by said x and y coordinates and an anticipated z coordinate on a generally horizontal building surface,
   determining the distance from the robotic total station to a point on the actual building surface which is illuminated by the beam, and
   if the distance from the robotic total station to the point on the actual building surface is greater or less than anticipated, repeatedly determining an updated construction point, directing the beam at the updated construction point, and determining the distance to the illuminated point on the actual building surface until the distance from the robotic total station to the point on the actual building structure is substantially equal to that anticipated,
   whereby a point on the actual building surface having said x and y coordinates is established.

2. The method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates according to claim 1 in which the method is discontinued after three points on the actual building surface have been illuminated without the distance from the robotic total station to the actual building surface being substantially equal to that anticipated.

3. The method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates according to claim 1, in which said generally horizontal building surface comprises a ceiling surface above the robotic total station.

4. The method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates according to claim 1, in which said generally horizontal building surface comprises a floor surface below the robotic total station.

5. The method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates according to claim 1 in which said construction data includes CAD files.

6. A method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates, comprising the steps of:
   selecting one of said plurality of construction points,
   generating a beam of laser light,
   directing the beam of laser light toward the selected construction point, defined by said x and y coordinates and an anticipated z coordinate on a generally horizontal building surface,
   determining the distance from the source of the laser light to a point on the actual building surface which is illuminated by the beam, and
   if the distance from the source of the laser light to the point on the actual building surface is greater or less than anticipated, determining an updated construction point, directing the beam at the updated construction point, and determining the distance to the illuminated point on the actual building surface until the distance from the source of the laser light to the point on the actual building structure is substantially equal to that anticipated, whereby a point on the actual building surface having said x and y coordinates is established.

7. The method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates according to claim 6 in which the method is discontinued after three points on the actual building surface have been illuminated without the distance from the source of the laser light to the actual building surface being substantially equal to that anticipated.

8. The method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates according to claim 6, in which said generally horizontal building surface comprises a ceiling surface above the robotic total station.

9. The method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates according to claim 6, in which said generally horizontal building surface comprises a floor surface below the source of the laser light.

10. A method of establishing the location of one of a of construction point at an indoor construction site, where the point is defined by x and y coordinates, and is spaced from a horizontal building surface, with the construction point being established on an actual building surface by illumination of a point on said actual building surface that has said x and y coordinates, comprising the steps of:
   generating a beam of laser light,
   directing the beam of laser light toward the selected construction point,
   determining the distance from the source of the laser light to a point on the actual building surface which is illuminated by the beam, and
   if the distance from the source of the laser light to the point on the actual building surface is greater or less than anticipated, determining an updated construction point, directing the beam at the updated construction point, and determining the distance to the illuminated point on the actual building surface until the distance from the source of the laser light to the point on the actual building structure is substantially equal to that anticipated,
   whereby a point on the actual building surface having said x and y coordinates is established.

11. The method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates according to claim 10 in which the method is discontinued after a predetermined number of points on the actual building surface have been illuminated without the distance from the source of the laser light to the actual building surface being substantially equal to that anticipated.

12. The method of establishing the location of one of a series of construction points at an indoor construction site, where the point is defined by x and y coordinates, with the construction point being established on an actual building surface by illumination of a point on said actual building surface that has said x and y coordinates according to claim 10, in which said generally horizontal building surface comprises a ceiling surface above the robotic total station.

13. The method of establishing the location of one of a series of construction points at an indoor construction site, where the point is defined by x and y coordinates and an anticipated z coordinate on a generally horizontal building surface, with the construction point being established on an actual building surface by illumination of a point on said actual building surface that has said x and y coordinates according to claim 10, in which said generally horizontal building surface comprises a floor surface below the source of the laser light.

* * * * *